April 1, 1924.
C. BIERNAT
AUTOMOBILE LIGHT
Filed June 7, 1923
1,489,056
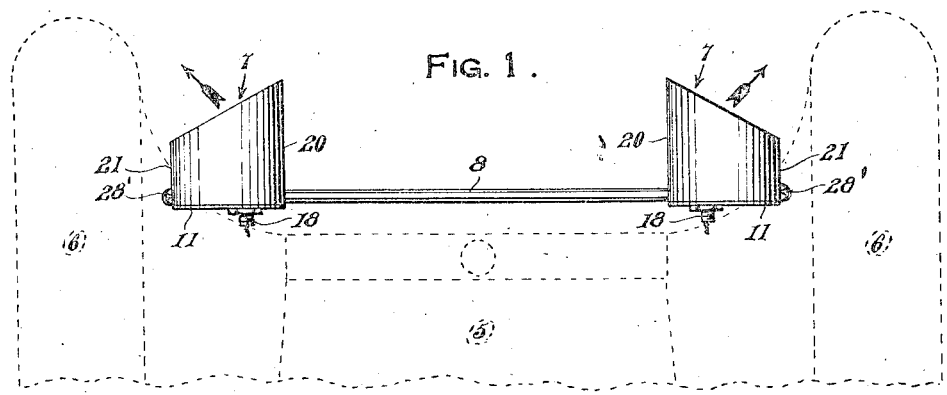
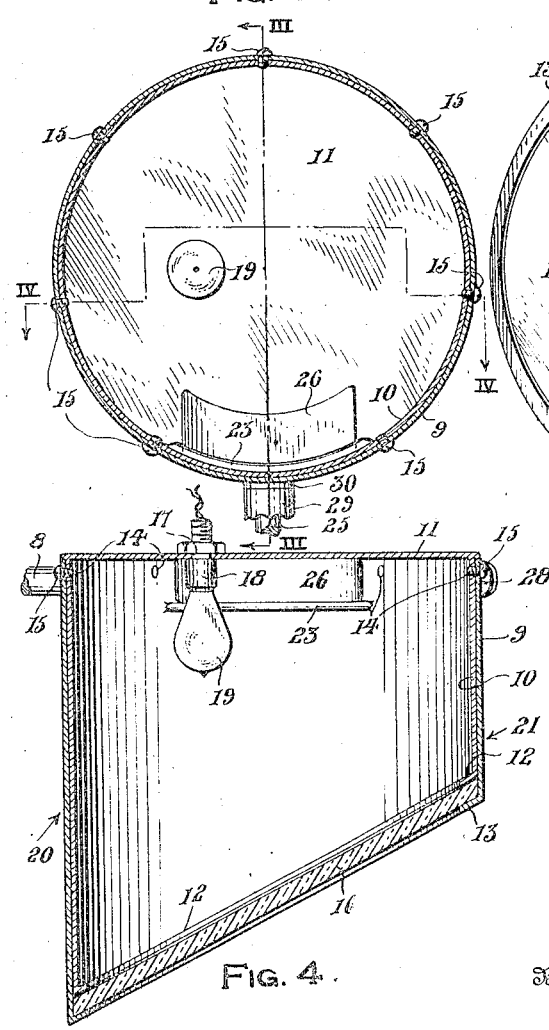
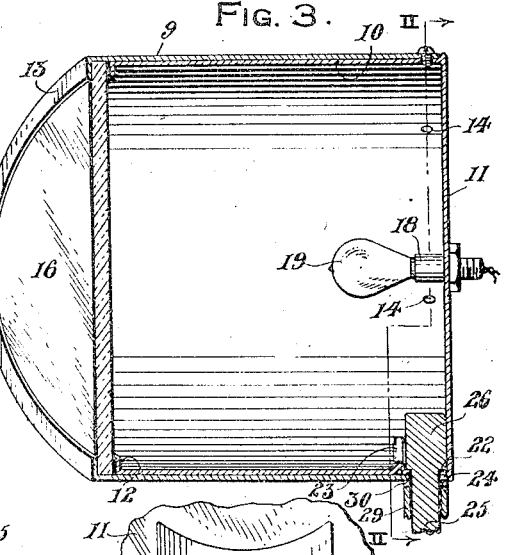
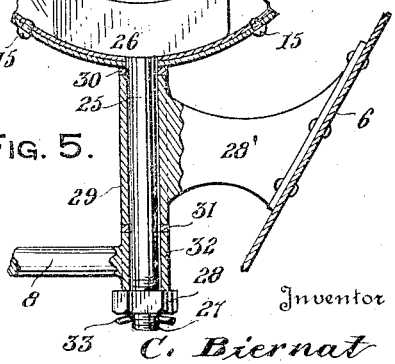
Inventor
C. Biernat
By
F. L. Bryant
Attorney Patented Apr. 1, 1924.

1,489,056

UNITED STATES PATENT OFFICE.

CARL BIERNAT, OF GLASFORD, ILLINOIS.

AUTOMOBILE LIGHT.

Application filed June 7, 1923. Serial No. 643,959.

*To all whom it may concern:*

Be it known that I, CARL BIERNAT, a citizen of Poland, residing at Glasford, in the county of Peoria and State of Illinois, have invented certain new and useful Improvements in Automobile Lights, of which the following is a specification.

This invention relates to new and useful improvements in headlights especially adapted for motor vehicles, such as automobiles and the like.

An important object of the invention is to provide a headlight which posesses novel features of construction that will enable the same to be manufactured at a nominal cost.

A further object of the invention is to provide a lamp casing which is of suitable form to cause a greater number of light rays to be reflected laterally to one side of the same than to the other side.

Other objects and advantages of the invention will be apparent during the course of the following description.

In the accompanying drawing forming a part of this specification and in which like numerals are employed to designate like parts throughout the same, Figure 1 is a plan view of a pair of the headlights embodying this invention shown properly positioned upon the forward end of an automobile, a fragmentary portion of which is shown in dotted lines, Figure 2 is a vertical transverse sectional view taken on line II—II of Fig. 3, Figure 3 is a vertical longitudinal sectional view taken on line III—III of Fig. 2, Figure 4 is a horizontal longitudinal sectional view taken on line IV—IV of Fig. 2, and Figure 5 is a fragmentary view showing the form of securing means employed for mounting the headlight embodying this invention upon an automobile.

Referring to the accompanying drawing and particularly to Fig. 1, there is shown a fragmentary view of the front end of an automobile which is designated generally by the numeral 5 while the front mudguards are referred to by the numeral 6. The lamp casings 7 are secured at their outer sides to the inner side walls of the forward mudguards 6 and are provided with a transversely extending bracing rod 8 which extends between the supporting brackets employed in connection with each lamp casing.

Referring particularly to Figs. 2 to 4 inclusive, it will be shown that these lamp casings 7 are each constructed from a pair of cylindrical members which are telescopically associated with each other, the outer cylindrical member being referred to by the numeral 9 while the inner member is referred to by the numeral 10. The inner cylindrical member 10 is closed at its inner end by means of the rear wall 11 and is provided at its forward circular edge with an annular inwardly directed flange 12, as shown best in Figs. 3 and 4. The outer cylindrical member 9 is entirely open at its inner end while the outer end is provided with an inwardly directed annular flange 13 that is formed integrally with the extreme forward edge of the same. The cylindrical walls of both members 9 and 10 are provided adjacent their inner or rear ends with suitably alined openings 14 that are adapted for receiving the connecting screw elements 15 for the purpose of retaining these two cylindrical members in assembled positions. The annular inwardly directed flanges 12 and 13 carried by the inner and outer cylindrical members respectively are provided for suitably securing the front lens 16 therebetween when the said inner and outer cylindrical members are retained in their assembled positions as shown in Figs. 2 to 4 inclusive. The rear wall 11 forming a portion of the inner cylindrical member 10 is provided with a suitable aperture 17 that is positioned eccentrically in respect to the axis of the said member and is adapted for receiving the socket 18 in which is mounted th electric bulb 19.

By examining Figs. 1, 3 and 4 it will be seen that the cylindrical cases 9 and 10 are properly constructed for forming diametrically opposite side walls 20 and 21, with the side wall 20 being of greater length than the said side wall 21. It is intended, by forming these diametrically opposite side walls of different length and by positioning the longer wall 20 of each casing inwardly in respect to the automobile 5 upon which the same are mounted, and with the electric lamp socket 18 positioned eccentrically or laterally of the axis of the same in the direction towards the longer wall 20, that a greater number of light rays will be reflected by this longer side wall for the purpose of throwing the said rays of light more upon the sides of a road for better enabling the driver of a vehicle to determine the exact position of the same, thereby greatly aiding in preventing the possibility of running off the side of the road into dangerous ditches or other excavations.

For the purpose of mounting these lamps upon the mud-guards 6 of the automobile 5, the inner cylindrical member 10 is provided with an aperture 22 in close proximity to the rear wall 11 and at the lower side of the side walls of the same. The cylindrical member 10 is further provided with a beading 23 that extends partially around the said cylindrical member parallel with the rear wall 1. The outer cylindrical member 9 is provided with a slot 24 that is adapted for alining with the aperture 22 formed in the inner cylindrical member 10. The aperture 22 and slot 24 are provided for receiving the post 25 which is formed with an arcuate, enlarged head 26 at its upper end while the lower end is screw threaded, as at 27 for the purpose of threadedly receiving the locking nut 28. Suitably secured to the inner side wall of the mud guard 6 is a bracket member 28' that is provided with a vertically positioned tubular portion 29 at its outer end which is adapted for receiving the post 25, as best shown in Fig. 5. Positioned between the upper end of this tubular portion 25 and the outer face of the cylindrical member 9 is a spacing washer 30 while a similar washer 31 is adapted for engaging the lower end of the tubular member 29 and the tubular end 32 of the transverse brace rod 8. It will be seen that this lock nut 28, when properly tightened upon the threaded end 27 of the post 25, will retain all of these members in their proper assembled position for the purpose of rigidly mounting the said lamp casing 7 to the automobile. A cotter pin 33 is inserted through a suitable transverse opening formed in the threaded end 27 of the post 25 for the purpose of preventing loosening of the lock nut 28, thereby insuring a rigid mounting of the said lamp casings 7.

It is thought that those skilled in the art will clearly understand the construction and assembly of the various elements employed for forming the headlights embodying this invention from the above detail description, therefore no further explanation of the same is deemed necessary.

It is to be understood that the form of this invention herewith shown and described is to be taken as the preferred example of the same, and that various changes in the shape, size, and arrangement of parts may be resorted to without departing from the spirit of the invention or the scope of the subjoined claim.

Having thus described the invention, I claim:—

In a device of the class described, a lamp casing comprising inner and outer telescopically arranged cylindrical members, a rear wall carried by the inner cylindrical member only, said members each having an aperture in the wall portion of the same in proximity to its rear edge, said apertures being axially alined, an inwardly projecting bead formed in the wall of the inner member adjacent said apertures, and a supporting post having an integrally formed enlarged arcuate head portion positioned within said apertures with the head portion engaging the bead formed in the wall of the inner member for preventing rotary movement of said post in respect to said casing.

In testimony whereof I affix my signature.

CARL BIERNAT.